United States Patent [19]
Aller

[11] 3,989,310
[45] Nov. 2, 1976

[54] PROPORTIONING DEVICE
[75] Inventor: Edmund R. Aller, Portage, Ind.
[73] Assignee: General American Transportation Corporation, Chicago, Ill.
[22] Filed: Feb. 10, 1972
[21] Appl. No.: 225,244

[52] U.S. Cl. .................................. 302/53; 222/193; 222/195; 302/35
[51] Int. Cl.² ........................................ B65G 53/66
[58] Field of Search .............. 222/55, 57, 193, 195, 222/373; 302/35, 42, 45, 47, 52, 53, 54

[56] References Cited
UNITED STATES PATENTS

| | | | |
|---|---|---|---|
| 493,587 | 3/1893 | Hotchkiss | 302/42 X |
| 2,650,726 | 9/1953 | Aller et al. | 214/83.28 |
| 2,789,739 | 4/1957 | Aller | 222/556 |
| 2,844,411 | 7/1958 | Aller | 302/51 |
| 3,001,829 | 9/1961 | Saint-Martin | 302/53 |
| 3,084,001 | 4/1963 | Loomis | 302/53 |
| 3,380,780 | 4/1968 | Allen et al. | 302/26 |
| 3,385,635 | 5/1968 | Carlsen | 302/53 |
| 3,393,943 | 7/1968 | Kelly | 302/53 |
| 3,708,209 | 1/1973 | Dugge | 302/53 |

FOREIGN PATENTS OR APPLICATIONS

| | | | |
|---|---|---|---|
| 1,350,024 | 12/1962 | France | 302/53 |

Primary Examiner—Evon C. Blunk
Assistant Examiner—Jeffrey V. Nase
Attorney, Agent, or Firm—Prangley, Dithmar, Vogel, Sandler & Stotland

[57] ABSTRACT

A proportioning device is provided for use with a sealable chamber for unloading pulverulent material from a bulk transport system which includes a fluid inlet conduit having one terminal end in communication with the chamber for transmitting fluid into the chamber for fluidizing the pulverulent material therein, a fluid outlet conduit having one terminal end in communication with the chamber for transmitting fluidized solids therefrom. The proportioning device is in communication with the other terminal end of the fluid inlet conduit and with the fluid outlet conduit and is adapted to be connected to a source of fluid for supplying the fluid to the fluid inlet conduit and the fluid outlet conduit, the fluid proportioning device being responsive to the fluid pressures in the fluid conduits for proportioning the fluid into the fluid inlet conduit and the fluid outlet conduit to maintain a predetermined ratio between the fluid pressures in the fluid inlet conduit and the fluid outlet conduit.

11 Claims, 20 Drawing Figures

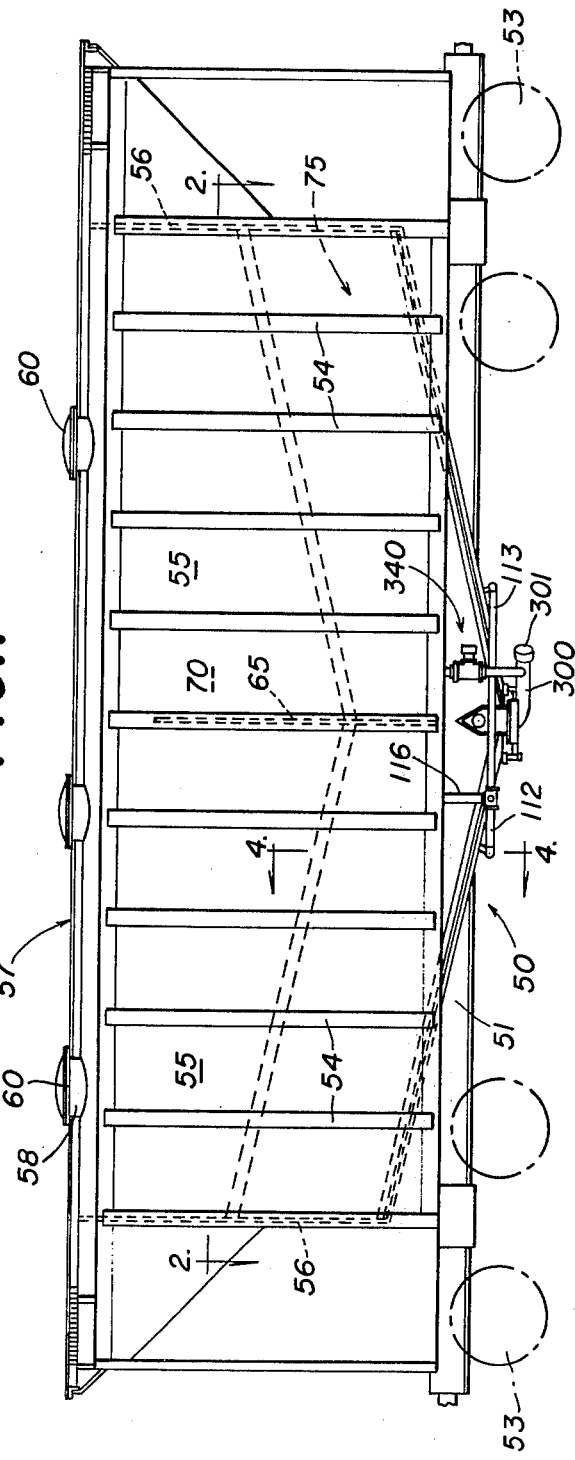
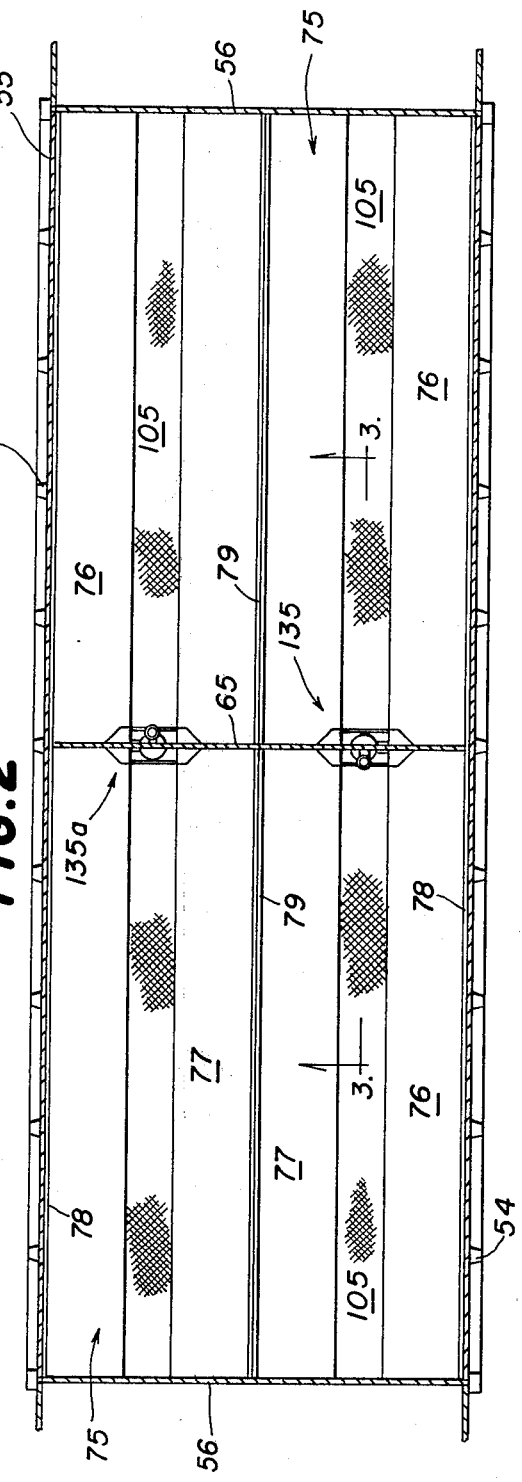

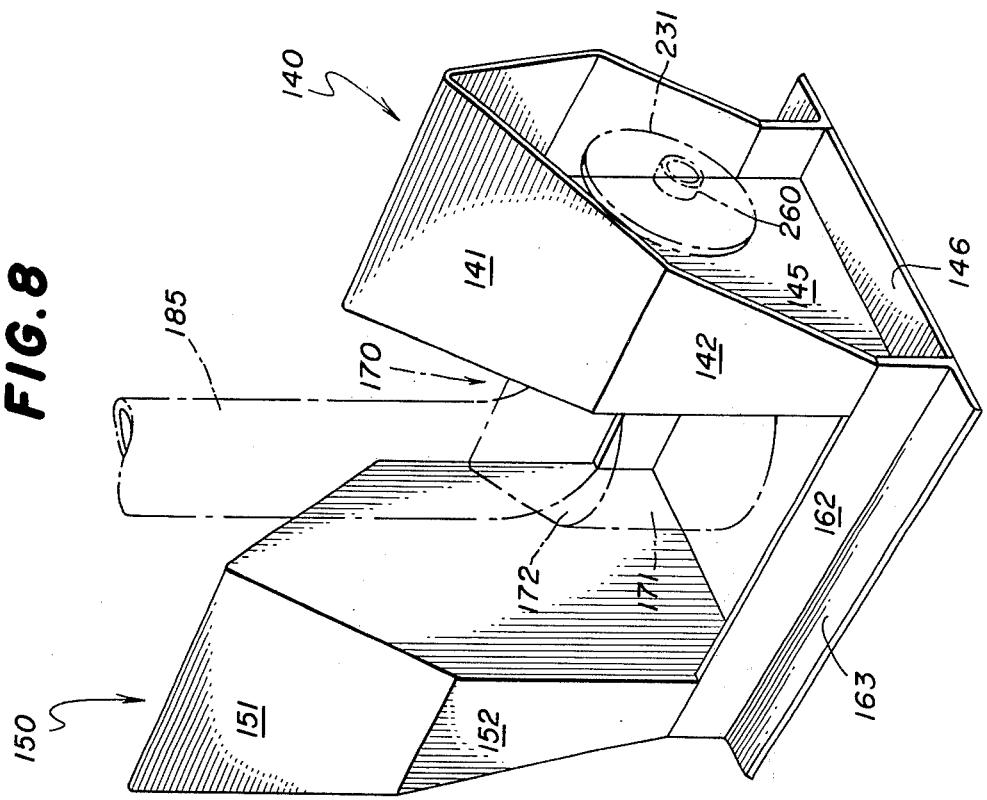
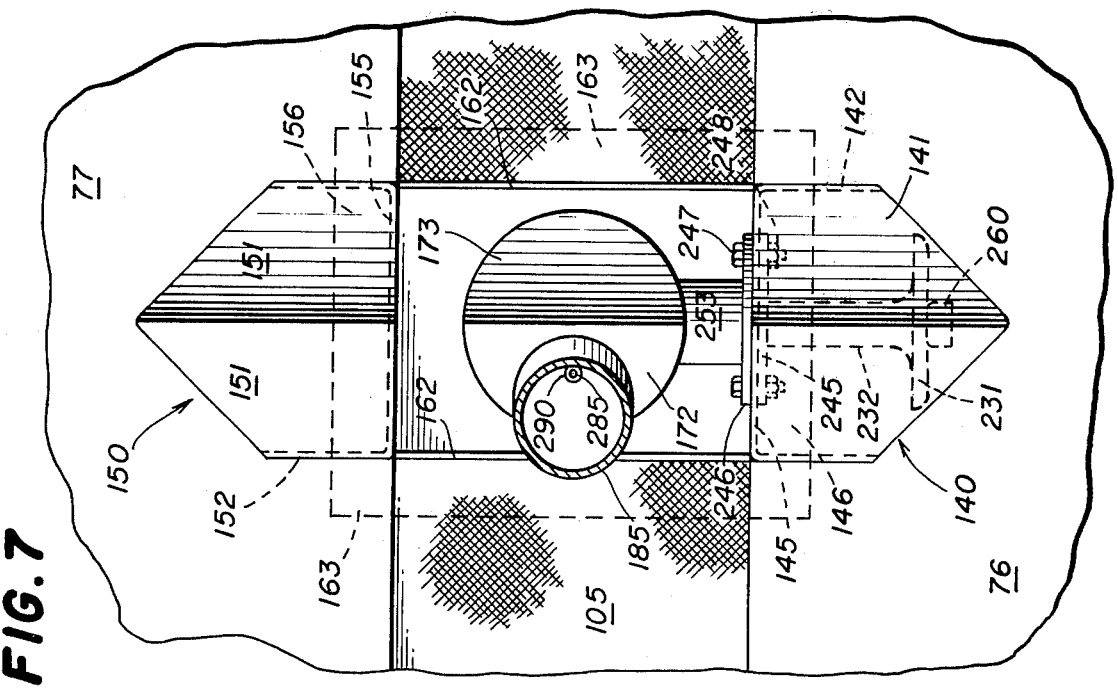

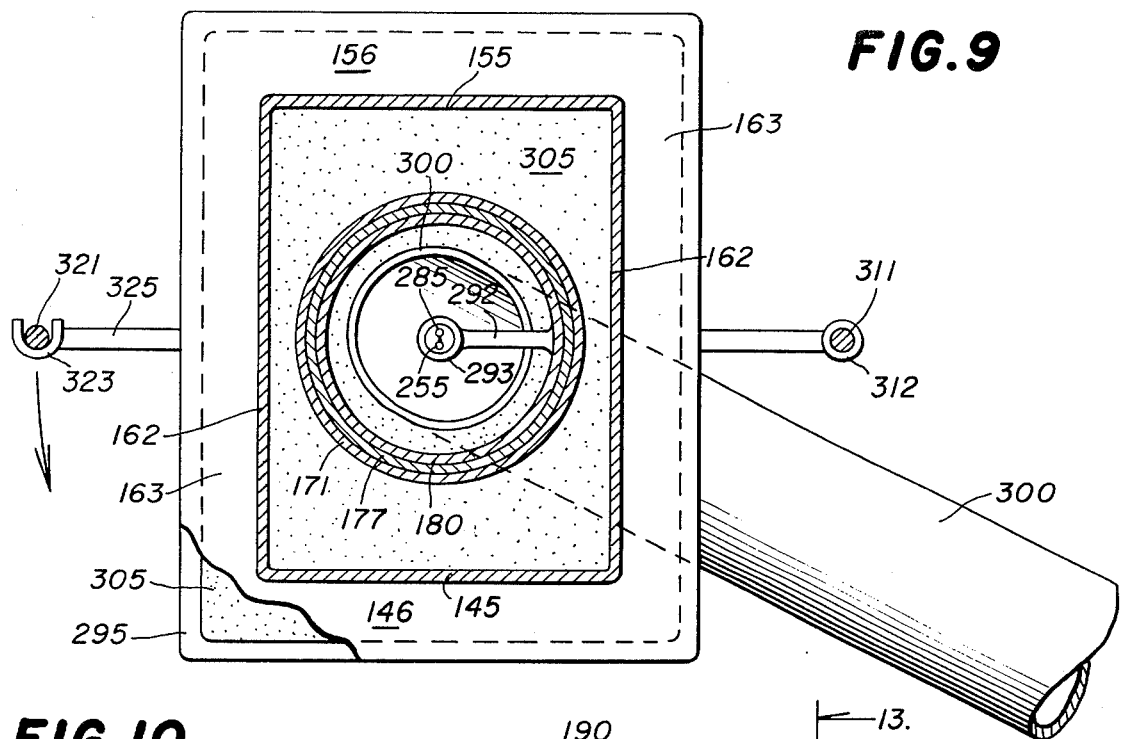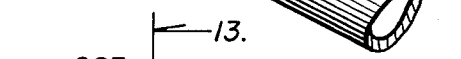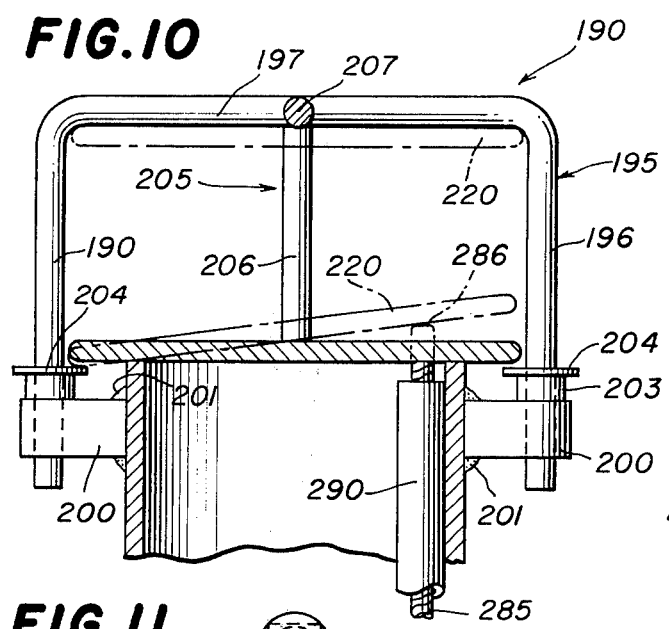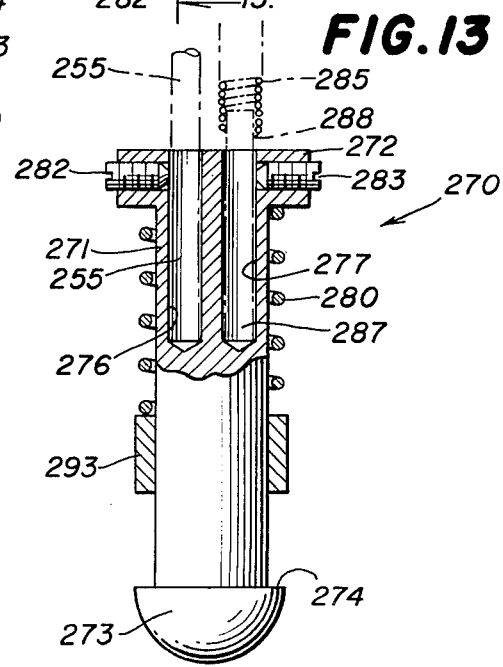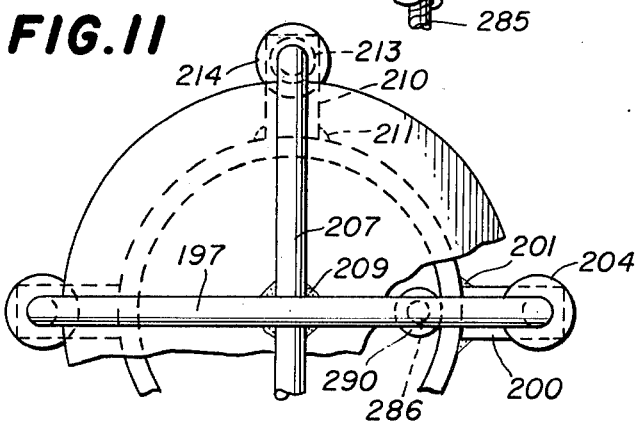

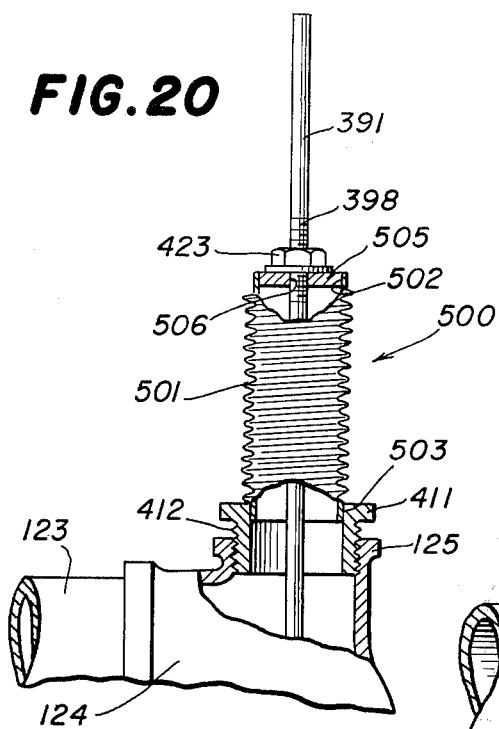
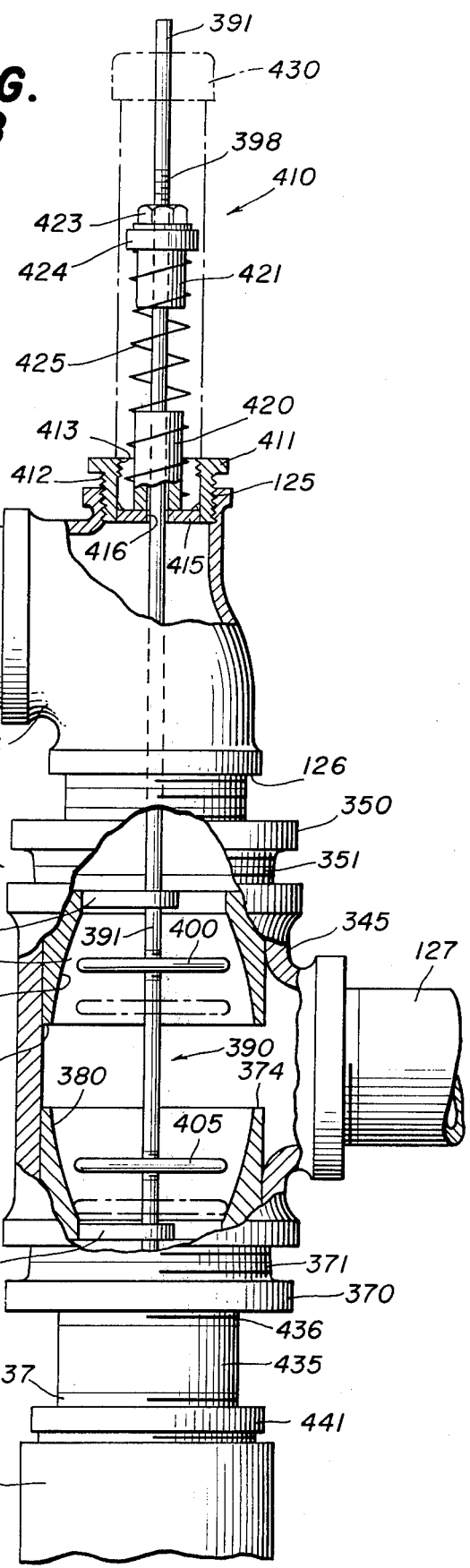
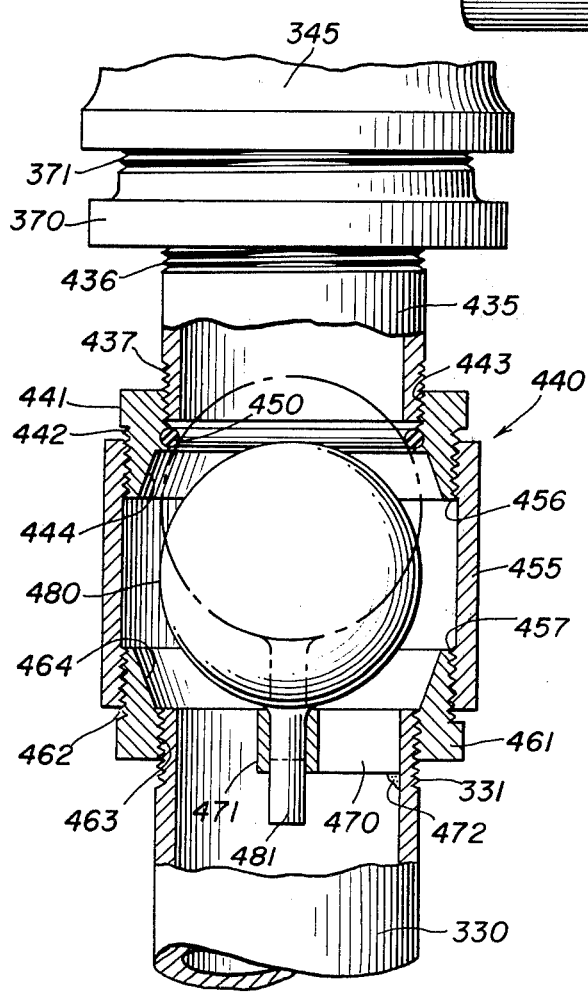

PROPORTIONING DEVICE

This invention is directed to a fluid proportioning device and more particularly the invention relates to a fluid proportioning device for use with a sealable chamber for unloading fluidized pulverulent material therefrom.

An important object of the present invention is to provide a sealable chamber for unloading pulverulent material from a bulk transport system, wherein the improvement comprises a fluid inlet conduit having one terminal end in communication with the chamber for transmitting fluid into the chamber for fluidizing the pulverulent material therein, a fluid outlet conduit having one terminal end in communication with the chamber for transmitting fluidized solids therefrom, a fluid proportioning device in communication with the other terminal end of the fluid inlet conduit and with the fluid outlet conduit, the proportioning device being adapted to be connected to a source of fluid for supplying fluid to the fluid inlet conduit and the fluid outlet conduit, the fluid proportioning device being responsive to the fluid pressures in the fluid inlet conduit and the fluid outlet conduit for proportioning the fluid from the fluid source into the fluid inlet conduit and the fluid outlet conduit respectively to maintain a predetermined ratio between the fluid pressures in the fluid inlet conduit and the fluid outlet conduit.

Another object of the present invention is to provide a system of the type set forth wherein a biasing means is operatively connected to the fluid proportioning device for adjusting the proportion of fluid admitted to the fluid inlet conduit and the fluid outlet conduit, the fluid proportioning device being responsive to the biasing means and to the fluid pressure in the fluid inlet conduit and the fluid outlet conduit.

Still another object of the present invention is to provide a system of the type set forth wherein the fluid outlet conduit may be used for loading pulverulent material into the sealable chamber and means is provided for preventing fluid and pulverulent material from entering the proportioning device during the loading of the pulverulent material into the chamber through the fluid outlet conduit.

Yet another object of the present invention is to provide a system of the type set forth wherein the proportioning device is a valve including a pair of spaced-apart plates movable toward and away from the fluid inlet conduit and the fluid outlet conduit to proportion the fluid admitted thereto.

A further object of the present invention is to provide a valve of the type set forth wherein a biasing means is operatively connected to the spaced-apart plates for adjusting the position thereof with respect to the other terminal end of the fluid inlet conduit and the fluid outlet conduit to control the amount of fluid directed to the fluid inlet conduit and the fluid outlet conduit and to accommodate different fluid pressures therein.

A still further object of the present invention is to provide a proportioning valve of the type set forth wherein the spaced-apart plates are mounted on a spindle extending through a first and second nozzle mounted in a valve housing, the first and second plates being movable between a mininum fluidizing position and a maximum fluidizing position.

The invention, both as to its organization and method of operation, together with further objects and advantages thereof, will best be understood by reference to the following specification taken in connection with the accompanying drawings in which:

FIG. 1 is a side elevational view showing the proportioning device of the present invention mounted on a railway car providing a sealable chamber in communication with the fluid proportioning device;

FIG. 2 is a sectional view of the railway car shown in FIG. 1 taken along lines 2—2 thereof;

FIG. 7 is a top elevational view of the transfer mechanism for transmitting the pulverulent material to the outlet conduit;

FIG. 8 is a perspective view of the transfer mechanism shown in FIG. 7 and also showing the riser pipe and control wheel in phantom;

FIG. 9 is a view partly in section and partly broken away of the outlet conduit and associated discharge mechanism shown in FIG. 6 taken along lines 9—9 thereof;

FIG. 10 is an enlarged elevational view partly in section of the top of the riser pipe shown in FIG. 6;

FIG. 11 is a top elevational view of the riser pipe shown in FIG. 10 with the top partly broken away;

FIG. 12 is a top elevational view of a portion of the control mechanism for activating the discharge mechanism as shown in FIG. 6;

FIG. 13 is a side elevational view partly in section of the portion of the control mechanism shown in FIG. 12 taken along lines 13—13 thereof;

FIG. 18 is an elevational view partly in section of the proportioning device of the present invention showing the associated piping and a biasing mechanism therefor;

FIG. 19 is a sectional view partly in elevation showing a ball check valve for use with the proportioning device shown in FIG. 18; and FIG. 20 is a sectional view of an alternative biasing mechanism for the present invention.

Figure 3:
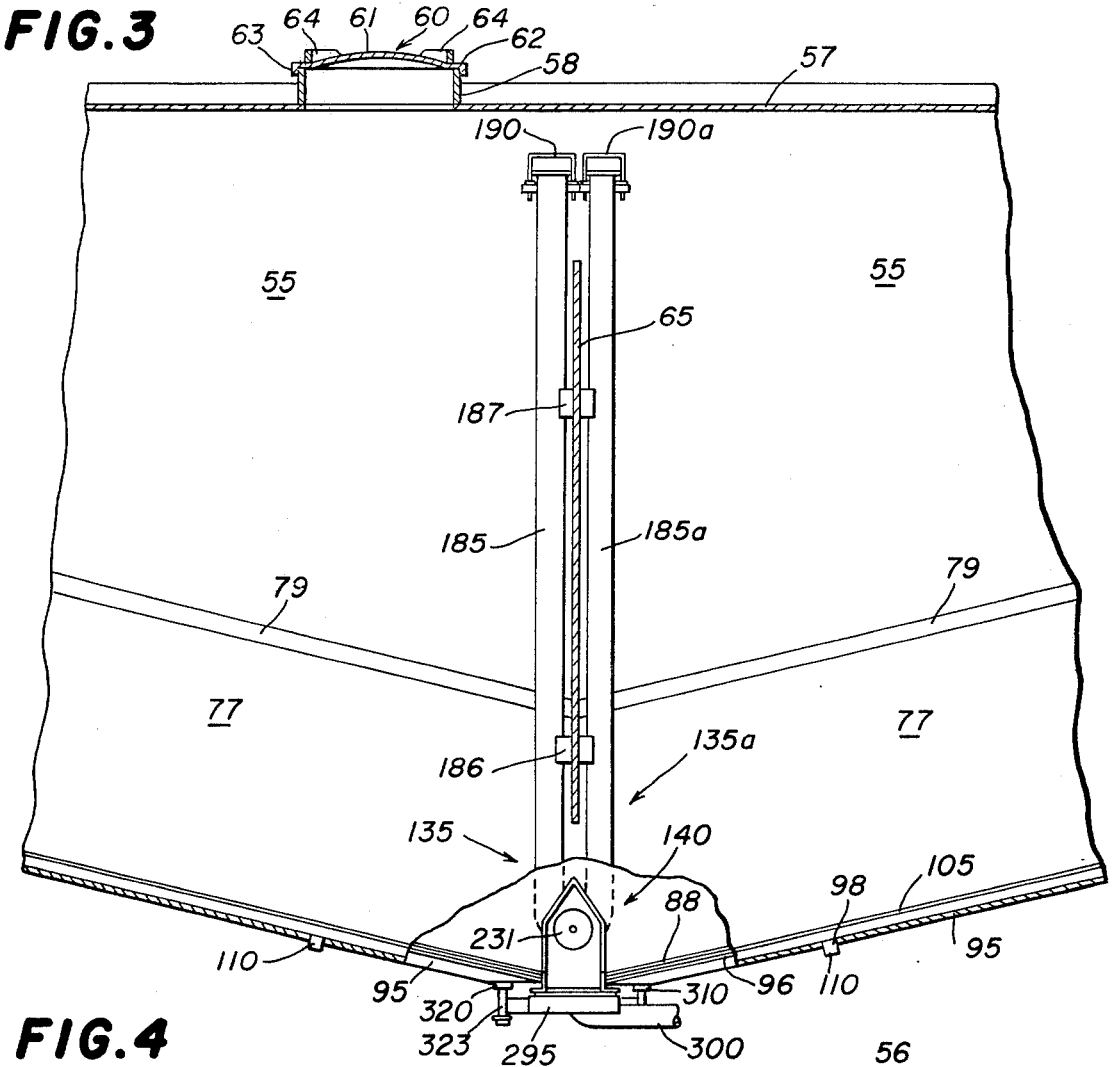
FIG. 3 is a sectional view of the railway car shown in FIG. 2 taken along lines 3—3 thereof and also showing the proportioning device of the present invention in elevation.
Figure 4:
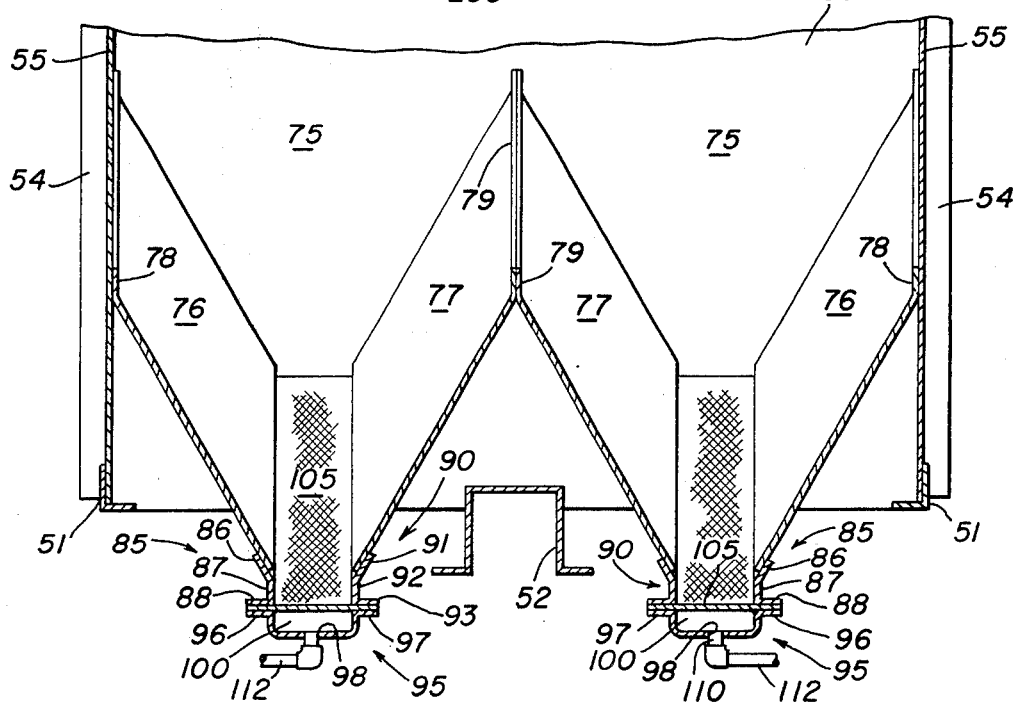
FIG. 4 is a sectional view of the sealable chamber and fluid plenum shown in FIG. 1 taken along lines 4—4 thereof.

The improved proportioning device of the present invention is particularly adapted for use in connection with a hopper from which flour, grain, cement or other finely divided or pulverulent materials are adapted to be discharged by pneumatic conveyance. Although the invention may be employed in conjunction with hoppers of various types, it has been illustrated in the accompanying drawings as being embodied in a railway car having a hopper in which the discharge of finely divided materials under the influence of the force of gravity is assisted by the aeration of these materials in the hopper through the use of equipment such as that disclosed in my U.S. Pat. No. 2,789,739 granted to me Apr. 23, 1957.

As illustrated in the accompanying drawings, the invention is embodied in a railway car 50 comprising side sills 51, a center sill 52, and supporting truck structure which include the wheels 53 and other parts not shown. Side stakes 54 extend upwardly from the side sills 51 and have secured to the inner faces thereof the side plates 55 which constitute the side walls of a hopper 70 in which the finely divided materials are stored or shipped. The hopper 70 is closed at its ends by a pair of end plates 56 and is closed at its top by a roof structure 57 provided with filling hatches 58 closed by hatch covers 60.

Each of the hatch covers 60, as seen particularly in FIG. 3, includes a dome plate 61 having a lateral flange 62 extending therefrom and a vertical flange 63 extending, in use, downwardly from the lateral flange 62. For each cover 60, the vertical flange 63 is positioned outwardly of the associated filling hatch 58 so as firmly to seal the hatch cover 60 over the filling hatch 58. The dome plate 61 is generally provided with reinforcement ribs 64 to improve the strength thereof.

The hopper 70 is further provided with a center bulk head 65 extending tranversely of the railway car 50 and dividing the hopper 70 substantially in half, the bulk head 65 extending transversely of the hopper 70 to each of the side plates 55 but not extending either to the roof structure 57 or to the bottom of the railway car, as best seen in FIG. 3. The hopper 70 is provided with two discharge troughs 75, as seen in FIG. 2, each of which extends longitudinally of the car and each of which is inclined downwardly from both of the end plates 56 to the transfer mechanisms 135 and 135a which are located midway between the ends of the car. Each of the troughs 75 comprises two pairs of inclined side plates 76 and 77. The side plates 76 are secured to the vertical side plates 55 and inclined downwardly therefrom while the flanges 78 extend upwardly. The side plates 77 are similarly placed in the middle of the car and extend downwardly while flanges 79 thereof are secured to each other above the center sill 52 so that each plate 77 converges downwardly with an opposed side plate 76. The two plates 76 and 77 of each of the troughs 75 are inclined downwardly from one end of the car and are joined at the center of the car with the corresponding plates of the same trough which are inclined downwardly from the opposite end of the car, thereby to form the two troughs 75.

Each of the side plates 16 of the discharge trough 75 is provided at the lower end thereof with an angle fitting 85, which fitting 85 has an attachment plate 86 secured to the side plates 76 as by welding. Integral with the attachment plate 86 is a vertical plate 87 and extending outwardly therefrom a horizontal plate 88. Similarly, each of the side plates 77 at the lower end thereof is provided with an angle fitting 90 having an attachment plate 91 secured to the side plate 77 as by welding. The angle fitting 90 further includes a vertical plate 92 integral with the attachment plate 91 and a horizontal plate 93 extending outwardly from the vertical plate 92. There is further provided for each of the troughs 75 a channel member 95 which is generally U-shaped and has an attachment flange 96 which is co-extensive with the horizontal flange 88 of the fitting 85 and another attachment flange 97 which is co-extensive with the horizontal flange 93. Each of the channel members 95 is provided with an aperture 98, for a purpose hereinafter to be explained. Each of the channel members 95 forms a plenum 100 with a porous material 150 fixedly secured between the attachment flanges 96 and 97 and the respective ones of the horizontal plates 88 and 93, which plena 100 and the channel members 95 extend longitudinally of the car from both ends downwardly toward a transfer mechanism 135.

As will be apparent, the piping hereinafter described is associated with the transfer mechanism 135; however, identical piping mechanism is provided for the transfer mechanism 135a. For the sake of brevity, only one set of the piping mechanism will be described herein, it being understood that a duplicate set is provided in the railway car 50.

Figure 5:
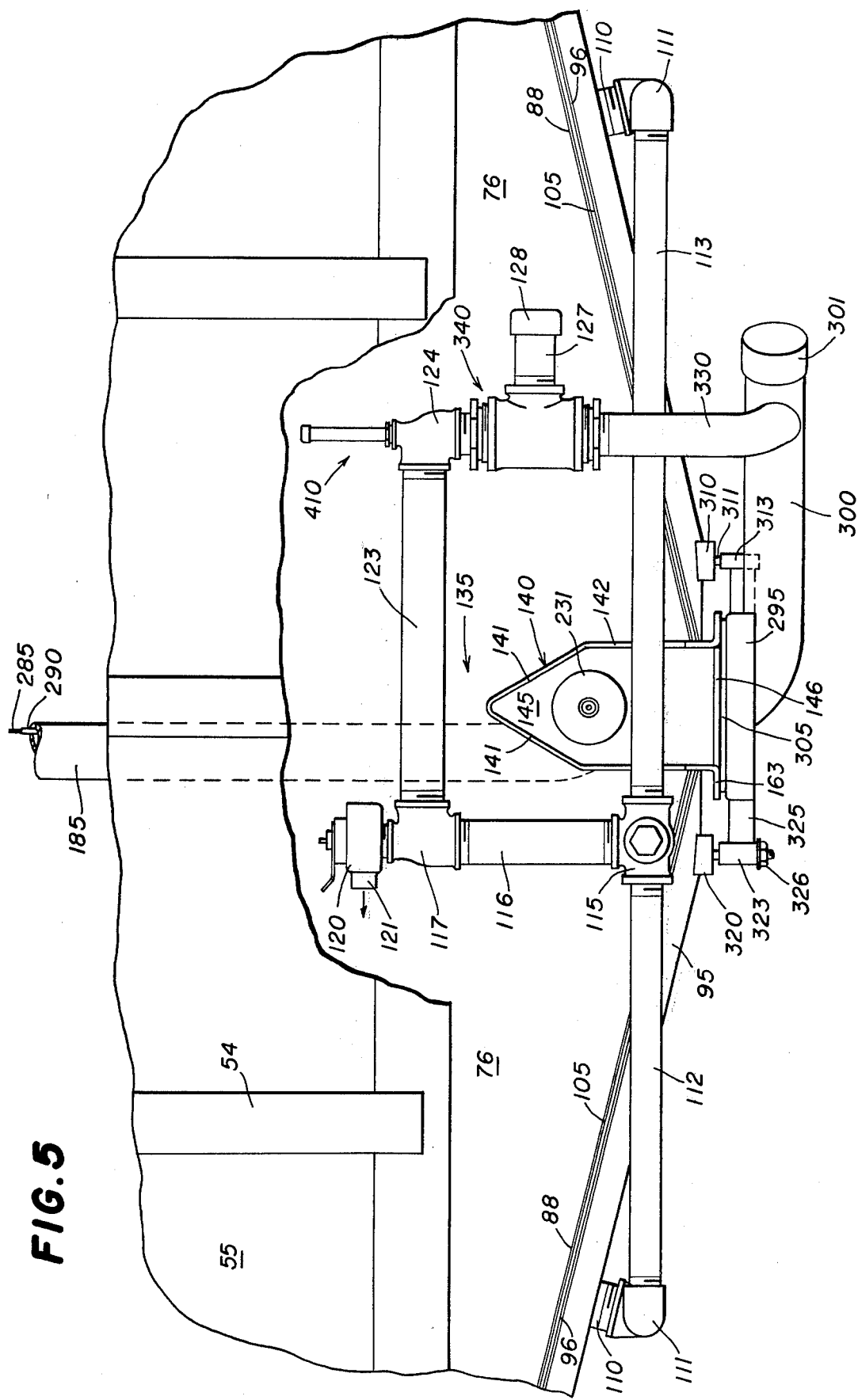
FIG. 5 is an enlarged elevational view of the proportioning device shown in FIG. 1 with certain portions of the railway car broken away and portions of the riser pipe shown in phantom.

As seen in FIG. 5, each of the fluid plena 100 is provided with an inlet fitting 100 threadedly secured within the aperture 98 of the respective channel member 95. Each of the inlet fittings 110 is connected to an elbow joint 111. A connecting pipe 112 extends from the elbow joint 111, on the left-hand side of FIG. 5, to a T-joint 115. A connecting pipe 113 extends from the elbow joint 111, on the right-hand side of FIG. 5, to the T-joint 115. Both of the connecting pipes 112 and 113 are threaded at each end thereof and are securely fastened in the respective elbow joints 111 and the T-joint 115. A connecting pipe 116 connects the T-joint 115 with another T-joint 117, the connecting pipe 116 being threadedly received into both the T-joints 115 and 117 thereby making a fluid-tight connection. A safety valve 120 is also positioned in the T-joint 117, which safety valve 120 is of the standard type that includes an exhaust port 121. The safety valve 120 may be set to operate for any predetermined pressure.

A connecting pipe 123 is threaded on either end thereof and extends between the T-joint 117 and an elbow 124, the elbow 124 having a threaded aperture 125 at the top thereof and threaded aperture 126 at the bottom thereof. A fluid inlet conduit 127 is threadedly connected to a proportioning device 340, the fluid inlet conduit 127 having a removable cap 128 on the end thereof. The fluid inlet conduit 127 is adapted to be connected to a source of fluid, all as hereinafter to be explained.

The transfer mechanism 135 includes a hood 140 which extends through the adjacent side plate 76 of the discharge trough 75, the hood 140 including two sloping walls 141 each of which is integrally connected to a vertical wall 142, the transfer mechanism 135 particularly being shown in FIGS. 5–8 and 14. A face plate 145 interconnects the sloping walls 141 and the vertical side walls 142 and extends downwardly to a bottom flange 146, which flange 146 extends outwardly of the face plate 145. The face plate 145 has an aperture 147 in the center thereof, for a purpose hereinafter to be explained.

The transfer mechanism 135 further includes a hood 150 of the same general shape and configuration as the hood 140 but facing in the opposite direction and cooperating with and extending through the side plate 77. The hood 150 has two opposed sloping walls 151 each of which is integrally connected to a vertical side wall 152. There is also provided a face plate 155, as seen in FIG. 7, and a bottom flange 156 extending outwardly therefrom. Interconnecting the hood 140 with the hood 150 is a pair of upstanding walls 162 extending between the hoods 140 and 150 and connecting the same, each of the upstanding walls 162 being provided with an outwardly extending flange 163. As may be seen, therefore, the hoods 140 and 150 extend through the adjacent side plates 76 and 77 respectively and are connected so as to provide an open space therebetween, all for a purpose hereinafter to be explained.

Figure 6:
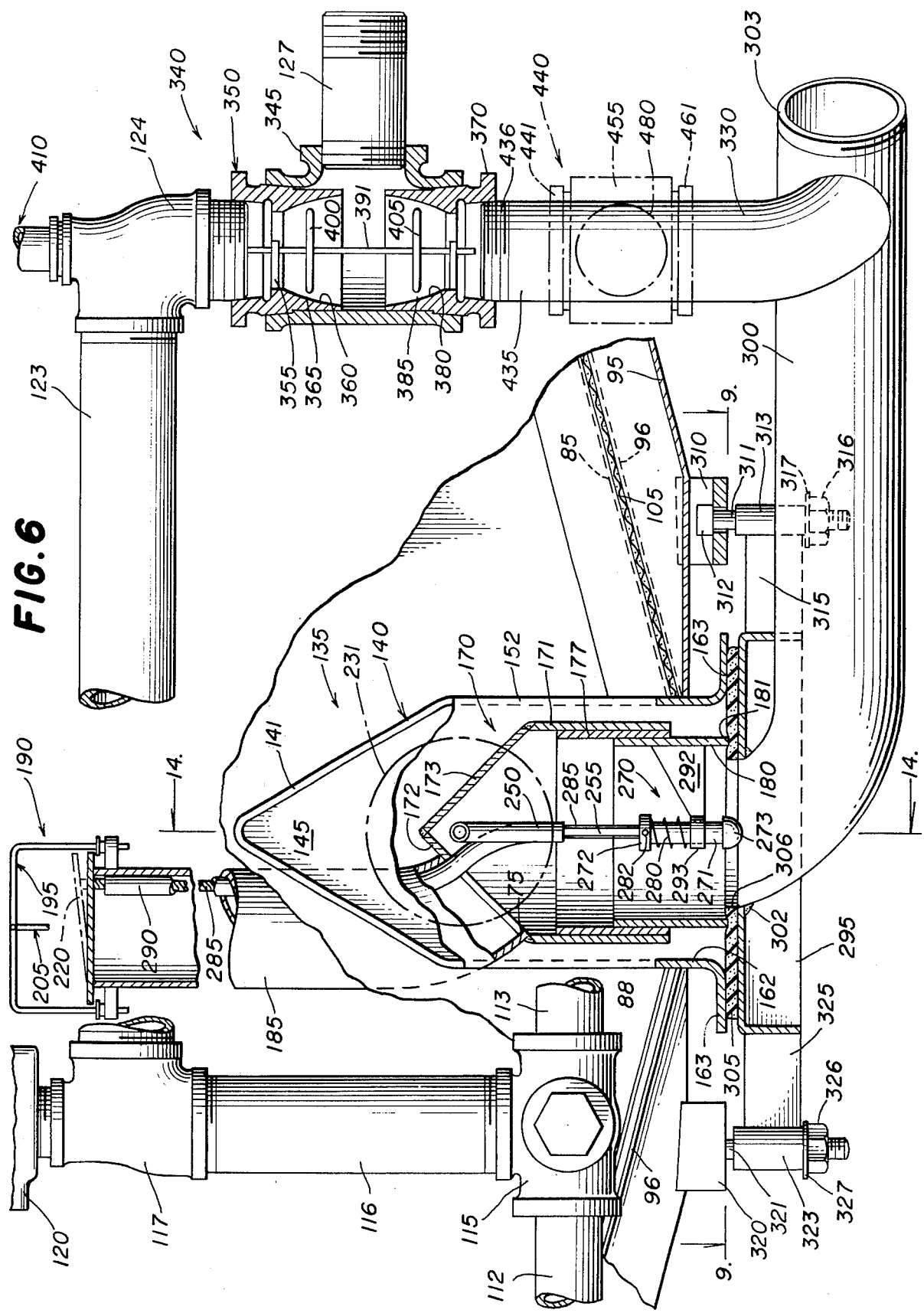
FIG. 6 is an enlarged view of the proportioning device shown in FIG. 5 partially in section and partially in elevation with certain portions of the inlet conduits and the riser pipe removed and with certain portions of the railway car broken away.
Figure 14:
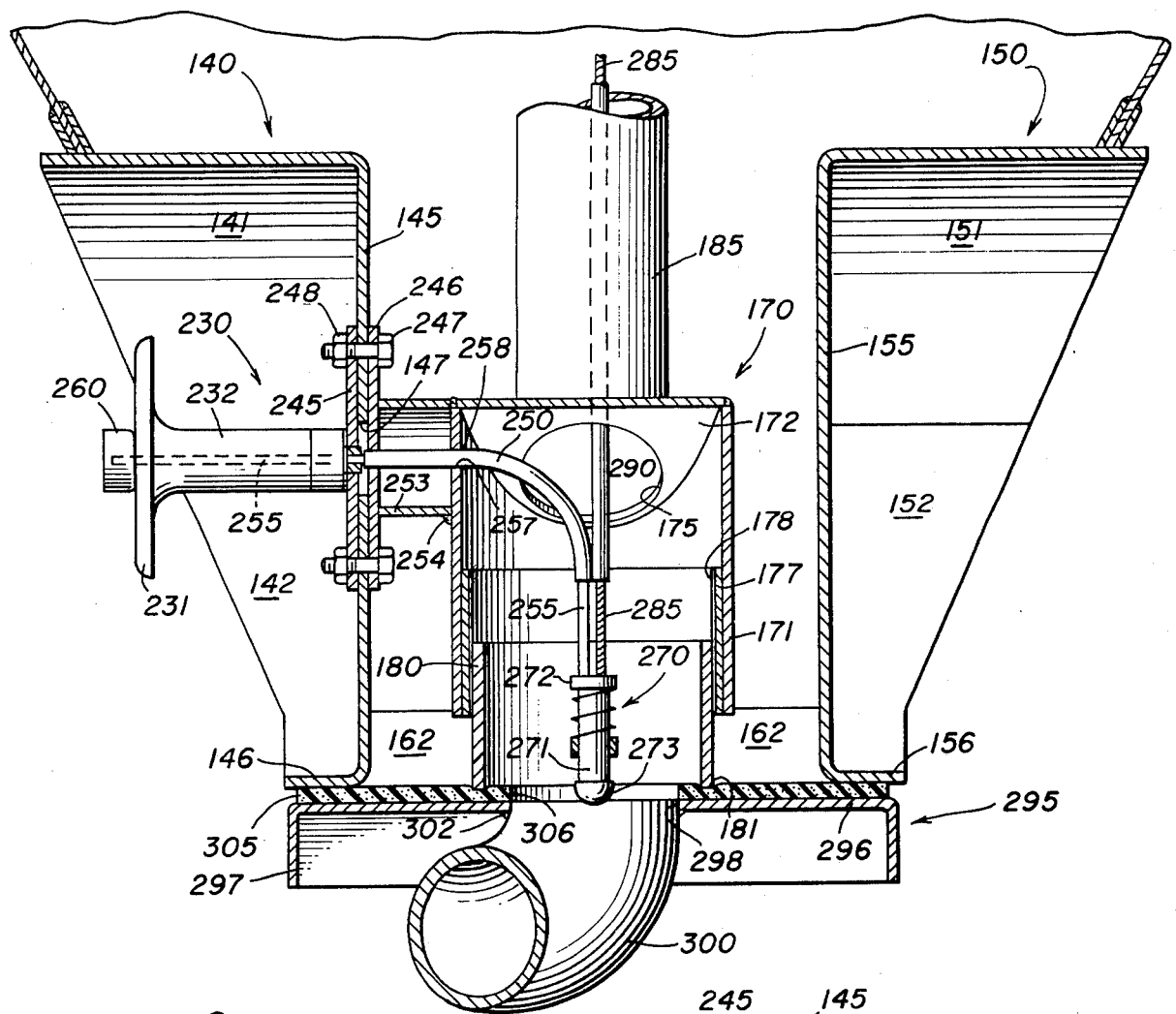
FIG. 14 is an enlarged side elevational view partly in section of the discharge apparatus shown in FIG. 6 taken along lines 14—14 thereof.

The transfer mechanism 135 further includes a chute 170 in the form of a right circular cylinder having a side wall 171 and two slanted top walls 172 and 173 connected to each other and to the side wall 171. The slanted top wall 172 has an aperture 175 therein. Referring to FIGS. 6 and 14, a liner or bushing 177 is positioned inside the cylindrical side wall 171 and fixedly secured thereto, the bushing 177 being coated as at 178 to prevent the pulverulent material housed within the hopper 70 from clogging the chute 170, the coating 178 being made of a plastic synthetic resin, such as "Teflon" or the like. A sliding valve 180 is provided within the bushing 177 and slidable with respect thereto, the valve 180 being cylindrical in shape and of a diameter so that it firmly abuts the bushing 177 completely around the periphery thereof, the valve 180 having an abutment edge 181 at the bottom thereof.

The transfer mechanism 135 further includes a distributor or riser pipe 185 extending from the slanted top 172 of the chute 170 upwardly into the hopper 70 toward the roof structure 57 of the railway car 50. As seen particularly in FIG. 2, there are two distributor pipes 185 and 185a, the distributor pipe 185a being for the transfer mechanism 135a, not shown in detail. The distributor pipe 185 is connected to the center bulk head 65 by means of a pair of spaced-apart brackets 186 and 187. The bottom of the distributor pipe 185 is placed over the aperture 175 and welded to the slanted wall 172 of the chute 170 so as to provide a fluid-tight seam and to provide communication between the pipe 185 and the chute 170.

The top of the distributor pipe 185 is particularly illustrated in FIGS. 6, 10 and 11 and is provided with a cage top 190 in the form of a U-shaped pipe 195 having spaced-apart arms 196 interconnected by a bight portion 197. There are two holding brackets 200 extending outwardly from the distributor pipe 185 and fixedly secured thereto by means of welds 201. Each of the holding brackets 200 have a fitting 203 positioned on top thereof, each of which fittings 203 have a flange 204 extending therefrom. The holding bracket 200, fittings 203 and flanges 204 serve to hold the U-shaped pipe 195 in a fixed position with respect to the top of the distributor pipe 185.

Another U-shaped pipe 205 is positioned transversely with respect to the pipe 195 and also includes two spaced-apart arms 206 interconnected by a bight 207. The pipes 195 and 205 are fixedly connected one to the other as by welds 209. The pipe 205 is fixedly connected to the distributor pipe 185 by means of a pair of holding brackets 210 fixedly attached to the pipe 185 by means of welds 211. Each of the holding brackets 210 includes a fitting 213 and a flange 204, which fittings and flanges hold the pipe 205 secured to the distributor pipe 185.

There is further provided a circular lid 220, which lid 220 has a diameter in excess of the diameter of the distributor pipe 185 and extends outwardly therebeyond. The lid 220 is freely positioned on top of the distributor pipe 185 and normally rests thereon. The dimensions of the cage 190 formed by the pipes 195 and 205 are such that the lid 220 may move between a position wherein it rests on top of the distributor pipe 185 and seals the same to a position wherein it contacts the pipes 207 and 197 and is spaced away from the top of the distributor pipe 185, all for a purpose hereinafter to be explained.

As best seen in FIGS. 6, 7, 14 and 15, there is further provided a control mechanism 230 for the transfer mechanism 135, which control mechanism includes a wheel 231 having a hollow shaft 232 extending therefrom, the wheel 231 having an aperture 233 extending therethrough. At the end of the hollow shaft 232 away from the wheel 231 there is provided a female threaded member 235 fixedly connected to the hollow shaft 232 as by welds 236, and at the other end of the hollow shaft 232 there is provided a spacer 237 positioned therewithin. As seen in FIG. 14, the hand wheel 231 is positioned to the left of the face plate 145 of the hood 140, that is outside of the railway car 50, the hand wheel 231 being illustrated in phantom in FIG. 7.

A hollow shaft 240 having external threads 241 thereon is positioned within the hollow shaft 232 of the hand wheel 231 and extends through the threaded female member 235 and is fixedly connected as by welds 242 to an apertured mounting plate 245 on the left-hand side of the face plate 145, as seen in FIG. 14, which is the outside of the railway car 50. Te apertured mounting plate 245 is positioned so that the aperture therein is in registry with the aperture 147 in the face plate 145 and is also in registry with an apertured mounting plate 246 positioned on the other side of the face plate 145. Bolts 247 and nuts 248 serve to mount the mounting plates 245 and 246 to the face plate 145. A tube 250 is fixedly mounted to the mounting plate 246 as by welds 251 and extends through a mounting cylinder 253 interconnecting the mounting plate 246 with the chute 170 and is fixedly connected thereto by means of welds 254. As may be seen, the chute 170 has an aperture 257 in the side thereof to accommodate the tube 250, and further, the tube 250 is secured to the chute 170 by means of welds 258. The mounting cylinder 253 serves to maintain the chute 170 in position when the valve 180 is moved upwardly, as will hereinafter be explained.

A cable 255 extends through the tube 250 and downwardly to a plunger 270, the cable 255 also extending through the mounting plates 245 and 246 and through the hollow shaft 240. The knob 260 is positioned externally of the wheel 231 and includes an aperture 261 through the knob 260. A hollow tube 262 extends through the knob 260 through the aperture 233 in the wheel 231 and through and into the hollow shaft 240, an O-ring 265 providing frictional contact between the hollow shaft and the tube 262. The terminal end of the tube 262 is connected to the cable 255. There is further provided a block 266 positioned within the knob 260 and having a set screw 268 threadedly received therein, which set screw 268 is in registry with the aperture 261 in the knob 260 and is adapted to pass through the tube 262 and thereby connect the cable 255 with the knob 260. Therefore, rotation of the wheel 231 results in movement thereof and the knob 260 toward and away from the car 50 but does not rotate the cable 255. There is further provided a set screw 269 in the spacer 237 which may be in engagement with the tube 262 thereby to prevent relative movement of the knob 260 with respect to the hand wheel 261.

As shown in FIGS. 6, 13 and 14, the plunger 270 includes an elongated shaft 271 having a flange 272 extending outwardly from the top thereof and a detent 273 at the bottom thereof, the detent 273 having an abutment surface 274 thereon. The shaft 271 of the plunger 270 has parallel elongated holes 276 and 277 extending downwardly from the flange 272 through th shaft 271 for a predetermined distance, the hole 276 receiving the cable 255 therein, which cable 255 is maintained within the shaft 271 and the hole 276 by means of a set screw 282. A rod 287 is maintained in the other hole 277 by means of a set screw 283, and a spring 280 is positioned around th shaft 271 between the flange 272 and a collar 293 through which the shaft 271 slidably passes. A spiral cable 285 is welded to the rod 287 as at welds 288, which spiral cable 285 extends upwardly through a tube 290 positioned inside the discharge pipe 185 and fixedly secured to one side thereof, as seen in FIG. 10, the spiral cable 285 having an abutment end 286 in contact with the lid 220. The collar 293 through which the shaft 271 passes is connected to a plate 292 which in turn is fixedly connected to the inside of the valve 180.

As seen in FIGS. 6, 9 and 14, there is provided a dump plate 295 positioned below the hood 140, which dump plate 295 includes a horizontally positioned rectangular base wall 296 and a side wall 297 extending downwardly from all sides of the base wall 296 which has a central aperture 298 therein. An outlet conduit 300 is fixedly connected to the dump plate 295 and particularly in registry with the aperture 298 therein by means of welds 302, the outlet conduit 300 having threads 303 on the end thereof away from the dump plate 295 with a cap 301 adapted to be threadably secured to the outlet conduit 300. A resilient pad 305 is positioned on top of the dump plate 295 and has an aperture 306 therein in registry with the aperture 298 of the dump plate 295 and in registry with the outlet conduit 300 thereby to provide communication between the outlet conduit 300, the chute 170 and the valve 180.

As best seen in FIGS. 6 and 9, the dump plate 295 is pivotally secured to the railway car 50 by means of a bracket 310 attached to the channel member 95, the bracket 310 accommodating a hinge pin 311 having a head 312 adapted to fit within the bracket 310 and to pivot with respect thereto. An arm 315 extends outwardly from the side wall 297 of the dump plate 295 and has on the distal end thereof a hollow shaft 313 through which is positioned the hinge pin 311. A nut 316 and washer 317 positioned at the bottom of the shaft 311 maintain the arm 315 and hence the dump plate 295 in position so as to sealably maintain the dump plate 295 in position with respect to th flanges 163, 146 and 156 of the transfer mechanism 135. Similarly, there is provided a bracket 320 on the other side of the hood 140, as seen in FIGS. 6 and 9, which bracket 320 is similarly provided with a hinge pin 321 which passes through a U-shaped member 323 on the terminal end of an arm 325 extending from the side wall 297 of the dump plate 295. Also, a nut and washer 326 and 327 serve to maintain the U-shaped member 323 in position on the hinge pin 321. As seen from FIG. 9, the U-shaped member 323 may be released from its fixed position so as to permit the arm 325 and the dump plate 295 connected thereto to be swung away from the bracket 320 and pivoted about the pin 311, thereby to swing the outlet conduit 300 and the dump plate 295 away from the transfer mechanism 135, all for a purpose hereinafter set forth.

Figure 16:
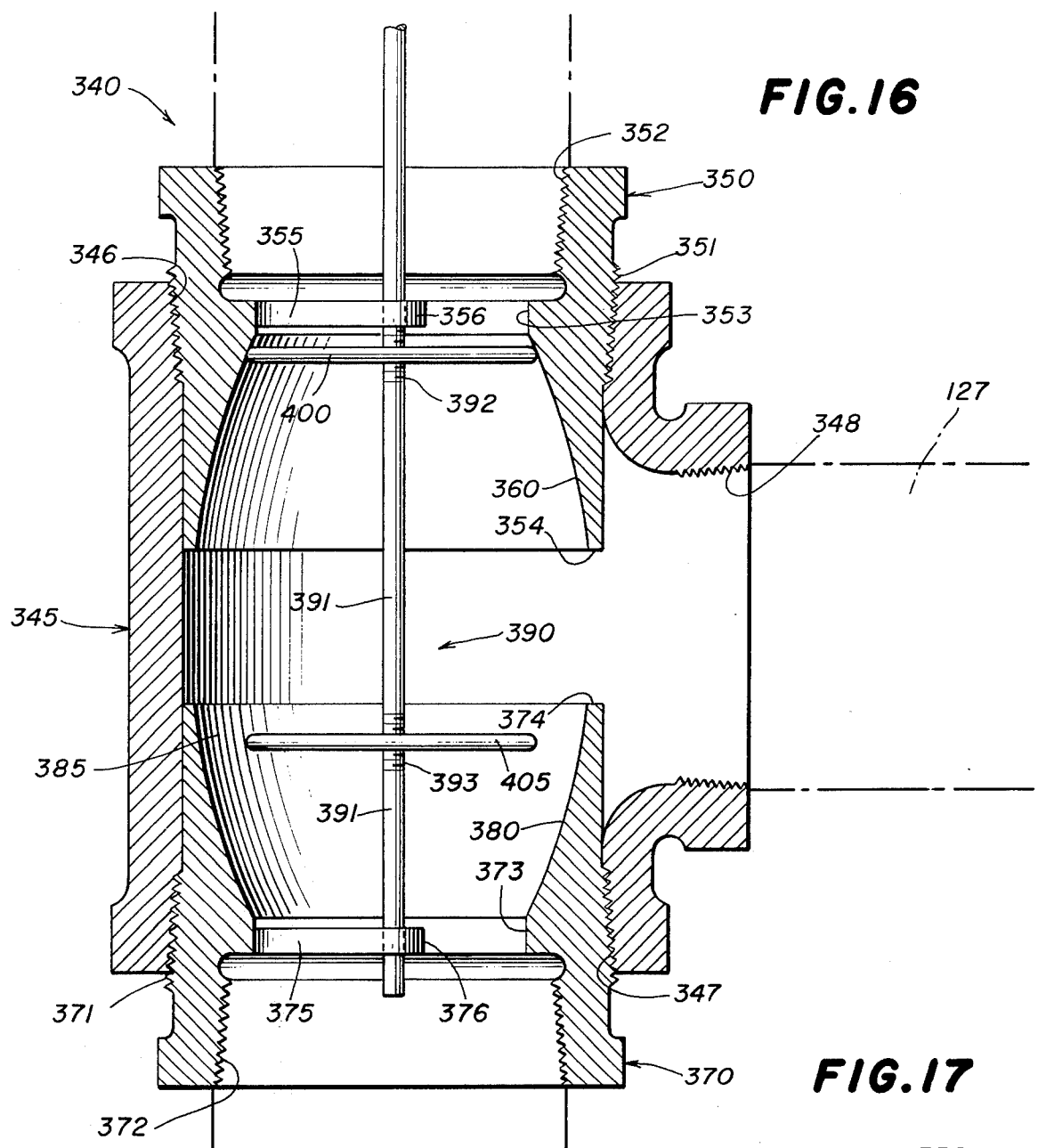
FIG. 16 is an enlarged view partly in section and partly in elevation of the proportioning device of the present invention.
Figure 17:
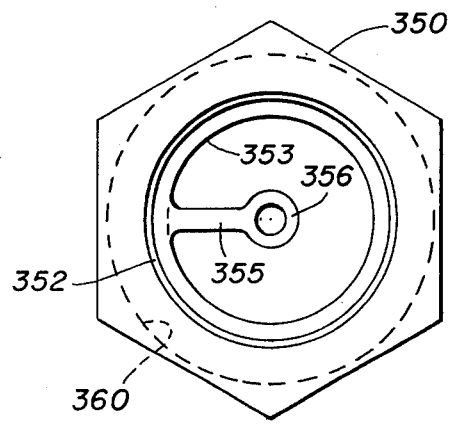
FIG. 17 is an end elevational view of the proportioning device shown in FIG. 16.

There is provided a connecting pipe 330 having threads 331, which pipe 330 extends from the outlet conduit 300 to a ball check valve 440, as seen in FIGS. 6 and 19, and another connecting pipe 435 having threads 436 at one end thereof and threads 437 at the other end thereof connecting the ball check valve 440 with the proportioning device 340. The proportioning device 340 is best seen in FIGS. 6, 16 and 18 and includes a T-shaped housing 345 having internal threads 346 at one end thereof and having internal threads 347 at the other end thereof and internal threads 348 at the stem of the T-shaped housing. The housing 345 is provided with a first nozzle 350 having external threads thereon which mate with the internal threads 346 of the housing 345 so as fixedly to position the nozzle 350 within the housing 345. The nozzle 350 further includes internal theads 352 at the top thereof which accommodate the connecting pipe between the nozzle 350 and the elbow 124. The nozzle 350 has a neck portion 353 below the threads 352, from which extends a valve support 355 having a cylindrical collar 356 at the end thereof. The nozzle 350 has a tapered inner peripheral surface 360 of special configuration as will hereinafter be set out.

A second nozzle 370 is provided with external threads 371 which are recieved within the internal threads 347 of the housing 345 thereby fixedly to position the second nozzle 370 within the housing 345. The nozzle 370 further includes internal threads 372 which accommodate the threads 346 of the connecting pipe 345 thereby to connect the proportioning device 340 with the ball check valve 440 which is in turn connected to the outlet conduit 300. Tenozzle 370 is provided with a neck 373 having a valve support 375 extending therefrom, which valve support has a hollow collar 376 at the end thereof. The inner periphery 380 of the nozzle 370 is of special configuration for a purpose hereinafter to be explained.

There is also provided a shuttle 390 which includes an elongated spindle 391 extending through the nozzles 350 and 370 and upwardly into a closing and biasing mechanism 410. The spindle 391 has spaced-apart threaded areas 392 and 393 thereon for respectively receiving a first plate 400 and a second plate 405. Th spindle 391 further includes a third threaded portion 398 near the uppermost portion of the spindle 391 for a purpose hereinafter to be explained. Each of the plates 400 and 405 are of the same size, are disc-shaped and are fixedly mounted on the spindle 391 although each of the plates 400 and 405 are adjustable longitudinally of the spindle, along the respective threaded areas 392 and 393 thereof. The spindle 391 passes through the collars 356 and 376 which are sufficiently large so as to permit the spindle to be slidable with respect thereto, thereby allowing movement of the plates 400 and 405 longitudinally of the respective nozzles 350 and 370. The area between the outer rim of the plate 400 and the inner peripheral wall 360 of the nozzle 350 is defined as a first flow area 365 and the area between the rim of the second plate 405 and the inner peripheral wall 380 of the nozzle 370 is defined as a second flow area 385.

The closing and biasing mechanism 410 includes a fitting 411 which is provided with external threads 412 which fit within the threads 125 of the elbow 124 and internal threads 413. At the bottom of the fitting 411 is a plate 415 having an aperture 416 through which extends the spindle 391. Positioned about the spindle 391 and resting on the plate 415 is a tube 420 to support the spindle. A bushing 421, having a flange 424 extending therefrom, is internally threaded and connected to a nut 423 which is positioned about the threaded area 398 on the spindle 391. A spring 425 is positioned between the flange 424 on the bushing 421 and the plate 415 at the bottom of the fitting 411. Finally, a cap 430, shown in phantom in FIG. 18, may be positioned over the spindle 391 and screwed into the fitting thereby to force the plate 405 downwardly to the position shown in FIG. 18 to close the proportioning device 340, all for a purpose hereinafter to be explained.

A valve closing mechanism or ball check valve 440 is shown in FIG. 19 and is positioned between the proportioning device 340 and the outlet conduit 300. The ball check valve 440 includes a fitting 441 which is provided with external threads 42 and internal threads 443, the internal threads 443 receiving therein the threads 437 of the connecting pipe 435 thereby to connect the ball check valve 440 with the proportioning device 340. The fitting 441 has an enlarged interior area due to the outwardly sloping walls 444, and an O-ring 450 is positioned in the fitting 441 near the top of the walls 444 and serves as a valve seat, as will hereinafter be explained. A valve body 455 is provided in the form of a tubular section having threads 456 which receive therein the threads 442 of the fitting 441 and having threads 457 which receive a second fitting 461 similarly shaped to the fitting 441 and having external threads 462 and having internal threads 463. The fitting 461 is also provided with outwardly sloping inner walls 464 of the same configuration as the walls 444 of the fitting 441. The threads 463 of the fitting 461 receive therein the threads 331 of the connecting pipe 330, which pipe 330 has a valve support 470 extending therefrom and welded thereto by means of welds 472. The valve support 470 has at the distal end thereof a sleeve 471 for receiving the stem 481 of a ball 480 positioned within the valve body 445. The ball 480 is hollow and of such a dimension that when it is in the position shown in phantom in FIG. 19, the ball 480 forms a fluid-tight seal with the O-ring 450.

Referring now to FIG. 20, there is disclosed an alternate embodiment to the closing and biasing device 410 for use with the proportioning device 340. The closing and biasing device 500 includes a bellows 501 having an upper end 502 and a lower end 503. A fitting 411 is adapted to fit within the opening 125 of the elbow 124 and receives the lower end 503 of the bellows 501. The joint between the lower end 503 of the bellows 501 and the fitting 411 is made fluid tight, as with an epoxy adhesive or the like. A plate 505 having a tapped aperture 506 is fixedly mounted in the upper end 502 of the bellows 501, the tapped aperture 506 being the correct size to receive th spindle 391 therethrough. The threaded area 398 of the spindle 391 provides for the necessary adjustment of the shuttle 390 with respect to the bellows 501, as hereinafter explained.

Operation of the railway car 50 including the proportioning device 340 of the present invention will now be described. Pulverulent material or particulate matter such as flour, cement or the like, may be loaded into the railway car 50 by two methods. In one method, one or more of the hatch covers 60 may be removed and the particulate matter or pulverulent material may then be introduced through the top of the railway car, the particulate matter falling into the two discharge troughs 75. In order that the particulate matter be retained within the troughs 75, the valve 180 must be in the closed and sealed position thereof, as shown in FIG. 14, wherein the abutment surfaces 181 of the valve 180 are in sealing contact with the resilient pad 305 positioned intermediate the dump plate 295 and the flanges 146, 156 and 163 of the transfer mechanism 135. since the porous material 105 forming the bottom of the discharge troughs 75 has a sufficiently small pore size so that the particulate matter cannot sift through, the particulate matter is held within the hopper 70 and the discharge troughs 75.

The second method for introducing particulate matter into the hopper 70 of the railway car 50 is to introduce a fluidized combination of the particulate matter in the carrier fluid through the outlet conduit 300 into the chute 170 through the aperture 175 therein and upwardly through the distributor pipe 185 and thereafter outwardly into the hopper 70. In order effectively to load the railway car 50 in the above-described manner, the valve 180 must again be in its sealed position as shown in FIG. 14, and the outlet conduit 300 must be connected to a source of fluid and particulate matter. In general, the fluid used for loading the car 50 is air which transports the particulate matter through the outlet conduit 300 through the aperture 298 in the dump plate 295, through the aperture 306 in the resilient pad through the valve 180 into the chute 170 and thereafter upwardly through the distributor pipe 185. The force of the air and the particulate matter will move the lid 220 from a rest position on top of the pipe 185 upwardly and away therefrom to the position shown in phantom in FIG. 10, thereby allowing the air and particulate matter to enter the hopper 70 and be distributed by gravity within the discharge troughs 75. In order to provide an outlet for the air carrying the particulate matter into the troughs 75, one of the hatch covers 60 is opened slightly in order to permit the exhaust of excess air from the railway car 50.

If particulate matter is loaded into the railway car 50 via the outlet conduit 300, care must be taken that no particulate matter works itself through the connecting pipe 330 and thereafter through the proportioning device 340 into the plena 100, thereby to clog the porous material 105 and prevent subsequent fluidization of the particulate material in the troughs 75. Care must also be taken to prevent the entrance of particulate matter into the proportioning device 340 so as to prevent the proportioning device from being damaged during the subsequent operation thereof.

Prevention of the entrance of particulate matter into the proportioning device 340 is effected in three ways. The ball check valve if present, as it is optional to the successful operation of the invention herein, 440 automatically prevents the entrance of particulate matter into the proportioning device 340. As hereinbefore described, the ball 480 is hollow and may be made from any suitable material such as aluminum, the important feature being that the hollow ball 480 be buoyant with respect to the fluidized particulate matter so that entry of the same from the outlet conduit 300 through the connecting pipe 330 will lift the ball 480 from its solid line position in FIG. 19 to the phantom line position therein, thereby to seal the proportioning device 340 from the entrance of particulate matter thereinto and therethrough into the plena 100. Since the O-ring 450 forms a fluid-tight seal with the ball 480, once the ball 480 reaches the position shown in phantom in FIG. 19, further passage of fluid or fluid and particulate matter is prevented. As may be seen, therefore, the ball check valve 440 serves as a closing mechanism to protect the proportioning device 340 and the porous material 105 from damage during the loading of particulate matter into the railway car 50 through the outlet conduit 300.

Another means of closing the proportioning device 340 so as to prevent damage thereof by particulate matter is through the use of the closing and biasing mechanism 410. By placing the cap 430 over the spindle 391 so as to force the spindle against the action of the spring 425 downwardly, as seen in FIG. 18, so that the plate 405 is in the phantom lined position thereof, the proportioning device 340 is protected against the entrance thereinto of particulate matter as the plate 405 forms a fluid-tight seal with the inner peripheral wall 380 of the nozzle 370. The cap 430 may also be used with the biasing mechanism 500 to compress the bellows 501 resulting in the positioning of the plate 405 as before described. In any case, once the particulate matter has been introduced into the railway car 50 so that the particulate matter resides within the discharge troughs 75, the railway car 50 is ready to be transported to its destination at which time it may be desired to unload the particulate matter from the railway car.

The railway car 50 may be unloaded of particulate matter therein in the following manner. The inlet conduit 127 is connected to a source of fluid, such as air, which is admitted to the proportioning device 340 through the inlet conduit 127. The cap 301 is removed from the outlet conduit 300. As may be seen particularly in FIGS. 5 and 6, air entering the inlet conduit 127 and flowing through the proportioning device 340 may flow through one of two paths. In one path, the air will flow from the proportioning device 340 through the conduit 435, the ball check valve 440, if present, and the connecting conduit 330 into the outlet conduit 300 and thereafter out of the outlet conduit.

A second path for the air flowing through the proportioning device 340 is through the conduits 123, 116, 112 and 113, and into the plena 100 formed by the channel members 95 and underlying the porous material 105 at the bottom of the troughs 75. Hereinafter, this path will be referred to as the trough path. Air flowing through this latter route will pass through the porous material 105 upwardly through particulate matter resting thereon so as to fluidize the same. As may be seen, therefore, the air inlet conduit 127 has one terminal end thereof in communication with the hopper 70 through the trough path.

Figure 15:
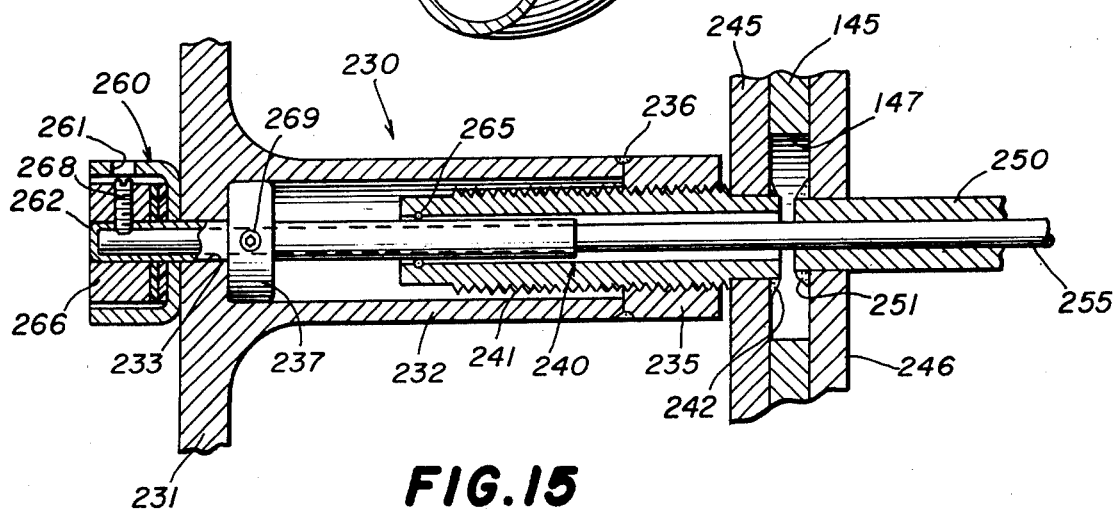
FIG. 15 is an enlarged sectional view of the control wheel for the discharge apparatus shown in FIG. 14.

After the cap 301 is removed, the initial step in unloading particulate material from the car 50 is to actuate the hand wheel 231, as best seen in FIGS. 14 and 15. Rotation of the hand wheel 231 results in the female thread member 235 rotating about the threads 241 on the hollow shaft 240 thereby to move the hand wheel 231 away from the mounting plate 245 and the face plate 145. As the control mechanism 230 and particularly the hand wheel 231 move away from the face plate 145 the cable 255 is also taken there along. Withdrawal of the cable 255 results in the movement of the plunger 270 from the position shown in FIGS. 6 and 14 upwardly due to the fact that the distal end of the cable 255 is fixedly connected to the shaft 271 of the plunger 270. Initial movement of the shaft 271 in the upward direction serves to move the spiral cable 285 upwardly within the tube 290 so that the abutment end 286 of the spiral cable 285 contacts the lid 220 resting on top of the distributor pipe 185 and moves the lid 220 away from the pipe 185 thereby to permit air inside the hopper 70 to flow through the distributor pipe 185 into the chute 170.

Continued rotation of the hand wheel 231 results in the plunger 270 and particularly the detent 273 rising so as to contact the collar 293 connected to the valve 180 by means of the plate 292. Further upward movement of the plunger 270 and particularly the dentent 273 results in an upward movement of the valve 180 against the liner or bushing 177, thereby to permit the particulate matter, fluidized in a manner hereinafter explained, to flow through the aperture 306 in the flexible resilient matter 305 and into the outlet conduit 300.

The bushing 177 is coated with a material such as "Teflon", a tetrafluoro polyethylene resin, which fits snuggly against the valve 180 to prevent particulate matter from lodging therebetween and thereby jamming the valve 180. As may be seen, once the valve 180 is in the raised position thereof, particulate matter is free to flow through the outlet conduit 300 into any convenient receptacle provided.

The proportioning device 340 operates to proportion the amount of fluid admitted to the plena 100 and thereafter into the troughs 75 to fluidize particulate matter therein and the amount of fluid admitted to the outlet conduit 300 to assist in conveying the particulate matter through the outlet conduit and out of the railway car 50. As hereinbefore described, the plates 400 and 405 are mounted on the spindle 391, which passes through the nozzles 350 and 370, the spindle 391 being free to move vertically in response to variations in pressure in the trough path and the conduit 300, thereby moving the plates 400 and 405 toward and away from the respective nozzle necks 353 and 373 to regulate the amount of fluid or air passing therethrough.

Since a predetermined amount of pressure is necessary to force the air through the porous material 105 which forms the bottom of the troughs 75, a greater pressure exists in the trough path than exists in the outlet conduit 300 when the outlet conduit 300 is at essentially atmospheric pressure. Since, as hereinbefore explained, initial operation of the control mechanism 230 and particularly rotation of the hand wheel 231 results in the lid 220 being spaced from the distributor pipe 185 to permit the outlet conduit 300 to be at atmospheric pressure, a pressure differential will exist between the trough path and the outlet conduit 300. In order to compensate for this pressure differential primarily due to the resistance of the porous material 105, the biasing means including the spring 425 or bellows 501 is provided and is adjusted to exert a force on the plates 400 and 405 through the spindle 391 sufficient to counteract the difference in pressure in the trough path and the outlet conduit 300, thereby to center the plates 400 and 405 within the respective nozzles 350 and 370.

Once the shuttle 390 has been thus centered, subsequent variations of the pressures in the trough path and the outlet conduit 300 will automatically drive the shuttle 390 from the neutral position thereof as shown in FIG. 18. When the pressure in the trough path increases, the shuttle 390 moves toward the outlet conduit 300, that is downwardly from the full line position shown in FIG. 18 so as to permit greater amounts of air to flow into the trough path and thereafter into the plena 100 and through the porous material 105 to fluidize the particulate matter in the hopper 70. Naturally, a lesser amount of air flows through the nozzle 370 into the conduit 330 and the outlet conduit 300 to assist in the pneumatic conveyance of the fluidized particulate matter through the conduit 300.

Conversely, when the pressure in the outlet conduit 300 increases, the shuttle 390 moves upwardly from the full line position shown in FIG. 18 so as to permit a greater amount of air to flow to the outlet conduit 300, thereby to assist in the pneumatic conveyance of the fluidized particulate matter through the outlet conduit 300 and out of the hopper 70. Naturally, when the shuttle 390 is thus positioned, a lesser amount of air flows through the nozzle 350 and the trough path into the plena 100 and thereafter through the porous material 105 to fluidize the particulate matter in the troughs 75. As may be seen therefore, the proportioning device 340 is responsive to variations in the air pressure in the trough path and the outlet conduit 300 to proportion the amount of air admitted to the troughs 75 to fluidize the particulate matter therein and the amount of air admitted to the outlet conduit 300 to convey pneumatically the fluidized particulate matter from the railway car 50, the proportioning device 340 being movable between a minimum fluidizing position thereof wherein a minimum amount of air is admitted to the plena 100 and a maximum fluidizing position thereof wherein a maximum amount of air is admitted to the plena 100.

The proportioning device 340 of the present invention is useful in unloading particulate material from the railway car 50 due to automatic operation thereof to alter the amount of air admitted to either the trough path or the outlet conduit 300 in response to variations in pressure therein to prevent jamming of the outlet conduit 300 or reduced fluidized rate of the particulate material from the troughs 75. Particularly, during the initial fluidization of the particulate material in the troughs 75, a substantially greater pressure exists in the trough path than in the outlet conduit 300, since little or no particulate matter is then in the outlet conduit 300. Because of the increase in pressure in the trough path, the shuttle 390 moves to a position downward from the neutral position thereof shown in FIG. 6, thereby admitting more air to the trough path and thereby through the porous material 105 to fluidize the particulate matter in the troughs 75. Once the fluidization of the particulate material in the troughs 75 has begun, the pressure in the trough path decreases. Thereafter, the shuttle 390 automatically moves upward toward the neutral position thereof and admits more air to the outlet conduit 300 to assist in transmitting the fluidized particulate material through the outlet conduit 300 and out of the railway car 50.

If, for some reason, fluidization of the particulate matter proceeds at too fast a rate for the transfer mechanism 135 to accommodate the same, excess particulate matter will accumulate in the outlet conduit 300 thereby causing increased fluid pressure therein resulting in the shuttle 390 moving upwardly from the normal position thereof shown in FIG. 18 to permit more air to flow through the nozzle 370, the connecting pipe 330 and into the outlet conduit 300, thereby to transport the particulate matter accumulating in the outlet conduit 300 and at the same time relieve the build up of pressure therein. Once a greater proportion of air has been transmitted to the outlet conduit 300 and the temporary blockage or excess particulate matter been relieved therefrom, the pressure in the outlet conduit 300 will subside and the shuttle 390 will move toward its neutral position wherein sufficient air is directed through the trough path and the outlet conduit 300 to maintain equal the pressure in the respective conduits.

In order for the proportioning device 340 to perform its assigned function of proportioning various amounts of fluids to the trough path and the outlet conduit 300 in response to variations of pressures therein, the shuttle 390 must be responsive to these pressures. In the preferred embodiment of the present invention the ratio of pressure in the trough path and outlet conduit 300 is maintained at one, and to that end the inner surface 360 of the nozzle 350 and the inner surface 380 of the nozzle 370 are shaped so that for any position of the shuttle 390 the sum of the two flow areas 365 and 385 are constant. This is accomplished in the preferred embodiment of the present invention by providing nozzles 350 and 370 wherein the area of a transverse section taken through either of the nozzles varies linearly longitudinally of the nozzle so that the area of the necks 353 and 373 is one-half the area of the mouths 354 and 374, respectively.

In a specific example, if the necks 353 and 373 of the nozzles have an inside diameter of 2.80 inches then the mouths 254 and 274 of the nozzles will have a diameter of 3.96 inches, whereby the area of the mouths of the nozzles will be 12.316 square inches, while the areas at the necks of the nozzles will be 6.1575 square inches. In order to determine the profile of the nozzles, the following formula is set forth:

$$D_x = d(1 + \frac{x}{L})^{1/2}$$

Where the following definitions pertain:
a. $D_x$ is the nozzle diameter at any point from the neck to the mouth;
b. d is the diameter of the neck of the nozzle; and
c. L is the distance between the neck and the mouth of the nozzle.

The following table sets forth a nozzle profile resulting from use of the above formula wherein the diameters ($D_x$) have been calculated for increments of 0.1 L.

| x/L | 1 + x/L | $(1 + x/L)^{1/2}$ | $(1 + x/L)^{1/2}(\times) 2.80$ Inches |
|---|---|---|---|
| 0 | 1.0 | 1.000 | 2.800 |
| .1 | 1.1 | 1.0488 | 2.937 |
| .2 | 1.2 | 1.0954 | 3.068 |
| .3 | 1.3 | 1.1402 | 3.193 |
| .4 | 1.4 | 1.1832 | 3.313 |
| .5 | 1.5 | 1.2247 | 3.429 |
| .6 | 1.6 | 1.2649 | 3.542 |
| .7 | 1.7 | 1.3038 | 3.651 |
| .8 | 1.8 | 1.3416 | 3.756 |
| .9 | 1.9 | 1.3784 | 3.860 |
| 1.0 | 2.0 | 1.4142 | 3.960 |

As hereinbefore noted, there have been provided two embodiments of the present invention. Where the predetermined ratio of fluid pressure in the trough path and the outlet conduit 300 is maintained at one, as in the preferred embodiment of the present invention, a spring 425 is provided to counteract the presence of a greater fluid pressure in the trough path due to the pressure needed to force fluid through the perforate material 105. The proportioning device 340 of the present invention constructed with the spring 425 operates as hereinbefore set forth and has the additional feature of moving rapidly between a position in which the plate 400 is in contact with the wall 360 of the nozzle 350 and a position in which the plate 405 is in contact with the wall 380 of the nozzle 370. Oscillation between these positions, the former being illustrated by the position shown in FIG. 16 and the latter being illustrated by the phantom line shown in FIG. 18, results in sudden and violent pulsations of fluid into the railway car 50 via the trough path, which violent pulsations actually cause the railway car 50 to vibrate and assist in cleaning out the car particularly when the amount of particulate material remaining in the car is small.

Another embodiment of the present invention is shown in FIG. 20, wherein the spring 425 has been replaced by a bellows 501 which provides a damping action not generally provided by the spring 425. The damping action of the bellows 501 results in more modulated movement of the plates 400 and 405 which eliminates the violent pulsations of fluid into the railway car 50. For both the sring 425 and the bellows 501 the theory of operation of the proportioning device is the same and both are effective to proportion the amount of fluid directed to the trough path and the outlet conduit 300 in response to the fluid pressures therein, thereby to maintain a continuous fluidization of the particulate material from the troughs 75 and at the same time to maintain a continuous removal of the particulate material through the outlet conduit 300 preventing stoppages therein.

By changing the effective strength of the spring 425 or bellows 501, it is possible to vary the ratio of pressure in the trough path to pressure in the outlet conduit 300 automatically maintained by the proportioning device 340. The above preferred embodiment was illustrated with the spring 425 being chosen to offset the difference in pressure between the trough path and the outlet conduit 300 prior to fluidization, which difference, as hereinbefore explained, is due to the resistance of the porous material 105. By adjusting the position of the nut 423 with respect to the threaded area 398 of the spindle 391, the amount of pressure exerted on the shuttle 390 by the spring 425 or the bellows 501 may be varied. By varying the pressure on the shuttle 390, the proportioning device 340 can be set to maintain a predetermined ratio of the pressure in the trough path to the pressure in the outlet conduit 300 when the shuttle is in its neutral position.

It is further noted that effective strength of the spring 425 or bellows 501 should be adjustable to accommodate various porous materials 105, since dissimilar materials may require different pressures to force the fluid therethrough.

The safety valve 120 is standard equipment to insure that excess pressure is not built up in the trough path, the valve 120 being adjustable to accommodate different maximum pressures in the trough path necessitated by changes in the porous material 105. In use a maximum trough pressure of about 6 psi has been found sufficient, and the valve 120 operates to relieve pressures greater than about 6 psi.

It should also be noted that the ball check valve 440 is an optional means for preventing fluid and particulate material from passing through the device 340 and into the plena 100 to clog the porous material 105. Operation of the cap 430 to force the shuttle 390 into its phantom-line position shown in FIG. 18 will suffice.

While there has been provided what is at present considered to be the preferred embodiment of the invention, it will be understood that various modifications may be made therein and it is intended to cover in the appended claims all such modifications as fall within the true spirit and scope of the invention.

What is claimed is:

1. In a sealable chamber for unloading pulverulent material from a bulk transport system, the improvement comprising a fluid inlet conduit having one terminal end in communication with the chamber for transmitting fluid into the chamber for fluidizing the pulverulent material therein, a fluid outlet conduit having one terminal end in communication with the chamber for transmitting fluidized solids therefrom, a fluid proportioning device in communication with the other terminal end of said fluid inlet conduit and with said fluid outlet conduit, said proportioning device being adapted to be connected to a source of fluid for supplying fluid to said fluid inlet conduit and said fluid outlet conduit, biasing means operatively connected to said fluid proportioning device for adjusting the proportion of fluid admitted to said fluid inlet conduit and said fluid outlet conduit, said fluid proportioning device being responsive to said biasing means and to the fluid pressure in said fluid inlet conduit and said fluid outlet conduit for automatically proportioning the fluid from the fluid source into said fluid inlet conduit and said fluid outlet conduit respectively to maintain a predetermined ratio between the fluid pressures in said fluid inlet conduit and said fluid outlet conduit.

2. The combination set forth in claim 1, wherein said biasing means is a spring.

3. The combination set forth in claim 1, wherein said biasing means is a bellows.

4. In a sealable chamber for unloading pulverulent material from a bulk transport system, the improvement comprising a fluid inlet conduit having one terminal end in communication with the chamber for transmitting fluid into the chamber for fluidizing the pulverulent material therein, a fluid outlet conduit having one terminal end in communication with the chamber for transmitting fluidized solids therefrom, a proportioning valve in communication with the other terminal end of said fluid inlet conduit and with said fluid outlet conduit and being adapted to be connected to a source of fluid for supplying fluid to said fluid inlet conduit and said fluid outlet conduit, said proportioning valve including a pair of fixedly spaced-apart plates movable in synchronism toward and away from said other terminal end of said fluid inlet conduit and said fluid outlet conduit, biasing means operatively connected to said spaced-apart plates for adjusting the position thereof with respect to said other terminal end of said fluid inlet conduit and said fluid outlet conduit to control the amount of fluid directed to said fluid inlet and outlet conduits and to accommodate different fluid pressures therein, movement of said spaced-apart plates toward and away from said fluid inlet conduit and said fluid outlet conduit being responsive to said biasing means and to the fluid pressures in said fluid inlet conduit and said fluid outlet conduit automatically for proportioning the fluid from the fluid source into said fluid inlet conduit and said fluid outlet conduit respectively to maintain a predetermined ratio between the fluid pressures in said fluid inlet conduit and said fluid outlet conduit.

5. The combination set forth in claim 4, wherein said biasing means is a spring.

6. The combination set forth in claim 4, wherein said biasing means is a bellows.

7. The combination set forth in claim 4, wherein said spaced-apart plates are interconnected and said biasing means acts simultaneously against said spaced-apart plates.

8. In a sealable chamber for unloading pulverulent material from a bulk transport system, the improvement comprising a fluid inlet conduit having one terminal end in communication with the chamber for transmitting fluid into the chamber for fluidizing the pulverulent material therein, a fluid outlet conduit having one terminal end in communication with the chamber for transmitting fluidized solids therefrom, a proportioning valve comprising a housing providing a first nozzle in communication with the other terminal end of said fluid inlet conduit and a second nozzle in communication with said fluid outlet conduit, said first nozzle and said second nozzle each having an opening at one end thereof which is twice the area of the opening in the other end thereof, said housing being adapted to be connected to a source of fluid for supplying fluid to said fluid inlet conduit and said fluid outlet conduit, a spindle mounted in said housing and extending into said first nozzle and said second nozzle, a first plate mounted on said spindle and positioned within said first nozzle and defining a first flow area therebetween, a second plate mounted on said spindle and positioned within said second nozzle and defining a second flow area therebetween, said first plate and said second plate being movable between a minimum fluidizing position wherein a minimum amount of fluid is admitted to said fluid inlet conduit and a maximum amount of fluid is admitted to said fluid outlet conduit and a maximum fluidizing position wherein the maximum amount of fluid is admitted to said fluid inlet conduit and the minimum amount of fluid is admitted to said fluid outlet conduit, the sum of the first flow area in the plane of the first plate and the second flow area in the plane of the second plate being constant for all positions of said spaced-apart plates between said minimum fluidizing position and said maximum fluidizing position, movement of said spaced-apart plates between the minimum and the maximum fluidizing positions thereof being responsive to the fluid pressures in said fluid inlet conduit and said fluid outlet conduit automatically to proportion the fluid from the fluid source into said fluid inlet conduit and said fluid outlet conduit respectively to maintain a predetermined ratio between the fluid pressures in said fluid inlet conduit and said fluid outlet conduit.

9. The combination set forth in claim 8, wherein said first plate and said second plate are the same diameter.

10. The combination set forth in claim 8, wherein said first nozzle and said second nozzle have the same internal configuration.

11. In a sealable chamber for loading pulverulent material into a bulk transport system and for unloading pulverulent material therefrom, the improvement comprising a fluid inlet conduit having one terminal end in communicaton with the chamber for transmitting fluid into the chamber for fluidizing the pulverulent material therein, a fluid outlet conduit having one terminal end in communication with the chamber for transmitting fluidized solids therefrom, an upstanding pipe in said sealable chamber connected to said one terminal end of said fluid outlet conduit, a valve connecting said upstanding pipe and said fluid outlet conduit and movable between an open position wherein fluidized pulverulent material may flow through said valve and into said fluid outlet conduit and a closed position wherein pulverulent and fluid may be transmitted through said fluid outlet conduit and into said upstanding pipe for disbursement into the sealable chamber, said fluid outlet conduit being adapted to be connected to a source of pulverulent material and a fluid for loading pulverulent material into the chamber, a fluid proportioning device in communication with the other terminal end of said fluid inlet conduit and with said fluid outlet conduit, said proportioning device being adapted to be connected to a source of fluid for supplying fluid to said fluid inlet conduit and said fluid outlet conduit, said fluid proportioning device being responsive to the fluid pressures in said fluid inlet conduit and said fluid outlet conduit during unloading of the pulverulent material from the chamber for automatically proportioning the fluid from the fluid source into said fluid inlet conduit and said fluid outlet conduit respectively to maintain a predetermined ratio between the fluid pressures in said fluid inlet conduit and said fluid outlet conduit, and means for preventing fluid and pulverulent material from entering said proportioning device during the loading of the pulverulent material into the chamber through said fluid outlet conduit from the source of fluid and pulverulent material.

* * * * *